UNITED STATES PATENT OFFICE.

THOMAS A. EDISON, OF LLEWELLYN PARK, NEW JERSEY.

MANUFACTURE OF CARBON FILAMENTS.

SPECIFICATION forming part of Letters Patent No. 485,616, dated November 8, 1892.

Application filed December 15, 1886. Renewed April 12, 1892. Serial No. 428,784. (No specimens.)

*To all whom it may concern:*

Be it known that I, THOMAS A. EDISON, of Llewellyn Park, in the county of Essex and State of New Jersey, have invented a certain new and useful Improvement in the Manufacture of Carbon Filaments, (Case No. 706,) of which the following is a specification.

The object of my invention is to produce flexible carbon filaments of high resistance for the incandescent conductors of electric lamps, which shall be of homogeneous structure and of even density and resistance throughout. In accomplishing this I employ as a material from which to make the filaments the oxygenated or non-volatile residues of resinous and bituminous substances, the same being properly carbonized. I may use such substance by itself, forming the filaments wholly therefrom, or I may mix the same with carbon or with infusible oxides in a finely-divided condition before carbonizing. Of the oxygenated residues of resins or bitumens I prefer to make use of what is known as "asphaltine," which is prepared from common refined asphalt by heating the same in the open air at about 250° centigrade until the volatile matters are driven off. The substance prepared in this way is allowed to cool, and I then break it up and reduce it to a fine powder. I then place this substance in a suitable mold having a small aperture in its bottom and provided with a suitable plunger. The mold being heated to the softening point of the material, the same is by means of the plunger forced out of the orifice in a small filament.

In the process above described the filaments are made directly from the residue of the distillation (or of the residue with the addition of graphite or an oxide)—that is, without the use of a binding agent. The use of a binding agent is found objectionable in the manufacture of the continuous filaments employed in incandescent lamps, as it is very difficult to mix it uniformly through the mass. Consequently the resistance is not uniform throughout the length of the filament. Moreover, in many cases the evaporation or distillation of the binding agent leaves the filament unduly porous and weak. When the filaments are made directly from the dry carbon by heat and pressure and are then carbonized, these difficulties are largely obviated. A number of these filaments, preferably bent into looped or arched form, are then placed in molds or boxes of carbon, being preferably suspended out of contact with each other and with the box, as set forth in my application, Serial No. 221,581, Case No. 705. Several of these boxes are placed in a suitable carbonizing-chamber and the whole is heated at a temperature a little below the softening-point of the material for about fifteen hours, or until the last traces of volatile matter are driven out. The heat is then slowly raised, which may at this time be done without softening or melting the filaments, to a temperature sufficient to carbonize the material, and such heat is maintained until the filaments are thoroughly carbonized. They are then removed from the carbonizing-receptacle and are ready for use in the lamps.

I may during the preparation of the asphaltine, just before all the volatile matters are driven off, mix with it a quantity of pure graphite in a finely-divided condition. After this is allowed to cool pieces of it may be put in the filament-forming press without first being reduced to powder, and by raising it to a high heat the filaments may be forced out in the manner already explained. The filaments so prepared need not be exposed to the slow heating or drying previous to carbonization, but may be carbonized at once in the usual manner, for the graphite prevents the softening of the filaments. Instead of graphite, infusible non-conducting substances—such as lime, magnesium, and aluminium—may be used. This gives filaments of higher resistance than those composed wholly of carbon. The asphaltine or similar substance may also be used in other ways. Filaments formed of infusible oxides, as set forth in other applications made by me, may be impregnated with such substance and then carbonized, which evidently forms filaments of the same character as if the infusible substance were mixed with the asphaltine and the mixture then made into filaments. In this case the asphaltine is first dissolved in benzole or other suitable solvent which is volatile at low temperatures.

I have principally described the use of asphaltine, since this is the substance I have found most suitable for use in the manner described. I may, however, use any bituminous or resinous substances heated below the carbonizing or decomposing point until nearly all their volatile constituents are driven off and then carbonized. Petroleum and rosin may be mentioned as suitable substances.

What I claim is—

1. Incandescent conductors for electric lamps formed of carbonized asphaltine, substantially as set forth.

2. The process of making filaments for incandescent electric lamps, consisting in heating a suitable hydrocarbon until the volatile constituents are driven off, then forming filaments from the dry-carbon residuum directly by heat and pressure—that is, without the addition of any binding material—and then carbonizing the filaments thus formed, substantially as set forth.

This specification signed and witnessed this 6th day of December, 1886.

THOS. A. EDISON.

Witnesses:
WM. PELZER,
E. C. ROWLAND.